United States Patent
Gössling

(10) Patent No.: US 6,547,060 B2
(45) Date of Patent: Apr. 15, 2003

(54) CONVEYING DEVICE

(75) Inventor: Manfred Gössling, Schermbeck (DE)

(73) Assignee: Dr. Ing. Gossling Maschinenfabrik GmbH (DE)

( * ) Notice: Subject to any disclaimer, the term of this patent is extended or adjusted under 35 U.S.C. 154(b) by 26 days.

(21) Appl. No.: 09/824,889

(22) Filed: Apr. 3, 2001

(65) Prior Publication Data

US 2001/0025766 A1 Oct. 4, 2001

(30) Foreign Application Priority Data

Apr. 3, 2000 (DE) ........................... 100 16 268

(51) Int. Cl.$^7$ ............................................ B65G 17/36
(52) U.S. Cl. ........................ 198/705; 198/701; 198/498
(58) Field of Search .................. 198/701, 705, 198/818, 499, 703, 498

(56) References Cited

U.S. PATENT DOCUMENTS

| | | | | | |
|---|---|---|---|---|---|
| 931,763 | A | * | 8/1909 | Humphreys | 198/494 |
| 1,052,972 | A | * | 2/1913 | Sargent | 198/705 |
| 1,298,978 | A | * | 4/1919 | Loken | 198/705 |
| 1,336,595 | A | * | 4/1920 | Stahl | 198/705 |
| 1,434,601 | A | * | 11/1922 | French | 198/705 |
| 1,449,223 | A | * | 3/1923 | Greiman | 198/705 |
| 1,449,224 | A | * | 3/1923 | Greiman | 198/705 |
| 1,719,219 | A | * | 7/1929 | George | 198/705 |
| 1,760,964 | A | * | 6/1930 | Ruth | 198/705 |
| 1,770,837 | A | * | 7/1930 | Carlesimo | 198/705 |
| 1,956,734 | A | * | 5/1934 | Swanson | 198/705 |
| 1,966,597 | A | * | 7/1934 | Penote | 198/705 |
| 2,368,114 | A | * | 1/1945 | Cartlige | 414/519 |
| 2,679,922 | A | * | 6/1954 | Everett | 198/705 |
| 4,171,582 | A | * | 10/1979 | Morooka | 198/705 |

FOREIGN PATENT DOCUMENTS

| | | | |
|---|---|---|---|
| DE | 37 42 728 C1 | * | 3/1989 |
| DE | 196 15 792 | | 6/1997 |
| DE | 694 04 235 | | 12/1997 |
| DE | 197 38 730 | | 7/1998 |
| DE | 198 53 519 | | 5/2000 |
| DE | 37 42 728 C1 | | 2/2001 |

* cited by examiner

*Primary Examiner*—Christopher P. Ellis
*Assistant Examiner*—Richard Ridley
(74) *Attorney, Agent, or Firm*—Cantor Colburn LLP

(57) ABSTRACT

The present invention concerns a conveying device with an endless conveyor belt, which has catches extending essentially transverse to the conveying direction.

In order to further develop a previously known conveying device so that small bulk articles, which tend to stick, are reliably removed from the conveying device at an end point of the conveying device, which cannot be reached satisfactorily with the known devices for stripping, it is proposed that the catches be deepened trough-like or elevated ridge-like modifications of the conveying surface in comparison with the conveying plane, and that the catches can be completely swept by means of at least one stripper lying elastically against the conveying surface.

13 Claims, 3 Drawing Sheets

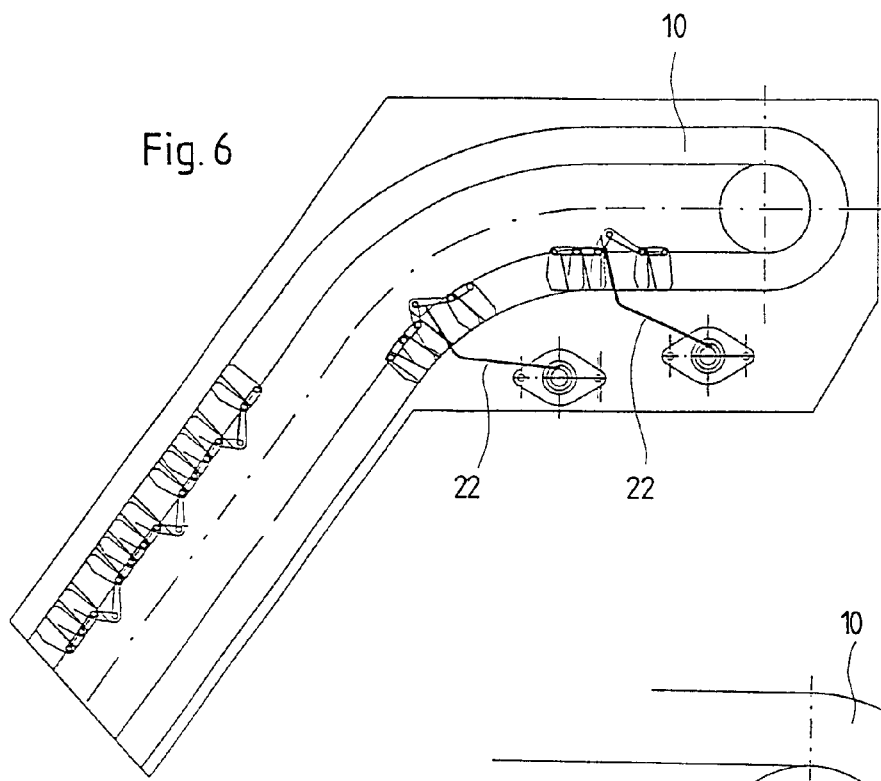
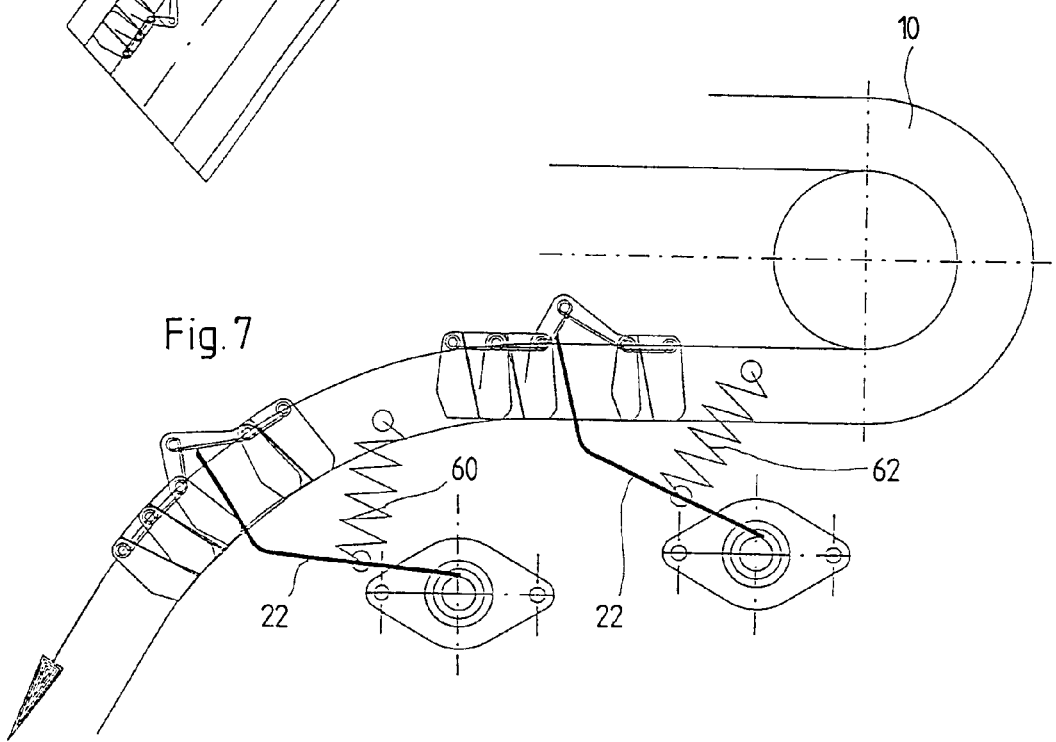

CONVEYING DEVICE

TECHNICAL FIELD

The present invention concerns a conveying device with an endless conveyor belt.

BACKGROUND OF THE INVENTION

Conveying devices with endless conveyor belts are used for transporting bulk articles, for example screws, bolts, and the like, within industrial production areas. In areas in which, for example, sharp-edged or hot bulk articles are conveyed, or in areas with a spatially crowded construction and with changes in the conveying direction, preferably chain-like steel-link belts are used, for example steel hinge belts. Any desired course of transport can be obtained by means of such belts with lateral guide chains.

A device, with which small bulk articles are conveyed via an S-shaped guided conveyor belt from a lower feed hopper to a higher sorting device, is previously known from DE 37 42 728 C1. In order to avoid an accumulation of small parts at a transition point from a lower horizontal receiving area to a rising area, the conveyor belt has an area with a more gradual slope adjacent to the feed hopper, which is connected to an area with a greater slope.

In the case of conveying, in particular, oily or emulsion-treated articles, frequently individual parts being conveyed stick to the conveyor belt by adhesion forces, for example the parts to be conveyed remaining at a discharge end on the conveyor belt. Such parts are either conveyed back with the return belt, or loosened from the conveyor belt at an unspecified point during the return, wherein they can collect under the conveyor belt and lead to contamination. Further, there is the possibility that in the case of a product change, parts from a previously conveyed production batch, adhering to the conveyor belt, may become mixed with parts of a subsequent production batch in an undesirable way.

In the case of conveying at a steep slope, usually conveyor belts with catches on the surface of the conveyor belt are used so that the bulk articles do not roll back or slide. Oily or emulsion-coated article also remain stuck here at corners or gussets of the catches. The material conveyed can indeed be removed with known stripping devices, but there are places, in particular in the area of catches, which are not reached by the stripping devices, so that parts adhering to these places are not removed.

SUMMARY OF THE INVENTION

The object of the present invention now consists in further developing a previously known conveying device in such a way that small bulk articles, which tend to stick, are reliably removed from the conveying device at an end point of the conveying device, in particular also at points which cannot be reached satisfactorily with known devices for stripping.

The object is achieved by means of a conveying device with an endless conveyor belt, which has catches extending essentially transverse to the conveying direction, which are modifications of the conveying surface, deepened in the form of a trough or elevated in the form of a ridge in comparison to the conveying plane, and which can be completely stripped by at least one stripper lying flexibly against the conveying surface.

Advantageously, strippers also can completely strip the conveyor belt surface in the area of the catch as a result of the shape of the catch in accordance with the invention. Thus bulk articles to be conveyed can be removed from the conveyor belt therewith completely and at a specific place.

Further it is proposed that the stripper be located over the entire width between the side walls of the conveyor belt. In this way it is possible to achieve that, in particular, the parts of conveyed material adhering to the side walls, as well as in the transition areas between side walls and conveyor belt surface, are removed.

Further, it is proposed that the conveyor belt be a link belt, and the catch be at least one link of the link belt. The suitability of link belts, for example for high requirements with respect to service life, can be combined advantageously simply and inexpensively with a catch according to the invention.

In an advantageous design it is proposed that the individual links of the link belt and the catch be hinged with one another in the conveying direction. This design makes it possible to use the cross rods of the hinges at the same time as chain bolts for a drive and guide chain. Costs and assembly expense can be saved. Separate fastening of the conveying chains with the link belt can be avoided.

According to a further design the catch is made in several parts and the individual partial surfaces are hinged with one another. In the case of trough-like catch links, which extend over more than one chain division, the partial surfaces of the catch links are made articulated advantageously so that they can match the different cord lengths on the end turn-around points.

Further it is proposed that the catch be made in one piece out of a springy material. The springy construction of the catch advantageously makes adjustment in the area of the end turn-around points possible, as well as a return to the original shape after passing a turn-around point automatically as a result of the spring effect. In addition, the number of different components and the amount thereof can be reduced, and as a result of this an inexpensive, qualitatively high-value conveyor belt can be obtained.

In addition to this, it is proposed that the catch be connected longitudinally elastically with the adjacent links of the link belt. In particular, a change of cord lengths can be compensated with this in turning areas.

Further it is proposed that articulations be mounted in slotted hole guides of the side walls of the catches. Advantageously the slotted holes can make possible a variable adaptation of the catch links at the time of passing a turn-around point, without the side walls having to be made flexible. Thus standard components can be used and costs can be saved.

In a further design according to the invention, it is proposed that the conveyor belt be made in one piece out of a single, endless structural element and the structural element have areas which are made as catches. A product favorable with respect to production engineering can be achieved at low costs.

Advantageously the side walls of the catches are made of offset, partially overlapping individual segments. By means of the special design it is possible to achieve that no gaps or openings, in which parts of conveyed material can adhere, result in the side walls in the case of a change in the conveying direction.

In order to avoid adherence of parts of conveyed material on the conveyor surface and/or the side walls, it is proposed that the conveyor surface and/or the side walls be made burled.

In addition, it is proposed that the elastic stripper be made out of a spring steel. Such a stripper can remove adhering parts of conveyed material fully effectively for a long service life and with low maintenance at moderate costs. For example, adherence from electrostatic forces via grounding of the stripper can be avoided.

It is particularly inexpensive to make the elastic stripper out of plastic. In addition, it can be worthwhile to use such a stripper when the parts of conveyed material themselves are sensitive to damage such as, for example, scratching.

BRIEF DESCRIPTION OF THE DRAWINGS

Further advantages and features are to be deduced from the following description of embodiments. The invention is not to be considered as limited to these examples. An expert can come to other solutions within the framework of this invention by simple combination of features according to the invention.

Here:

FIG. 6 shows a section of a conveying device with a directional change and an end turn-around, as well as with strippers, FIG. 7 shows a magnified section of the conveying device from FIG. 6 with strippers and FIG. 8 shows a side wall of a catch according to the invention.

DETAILED DESCRIPTION OF THE PREFERRED EMBODIMENT

Figure 1:
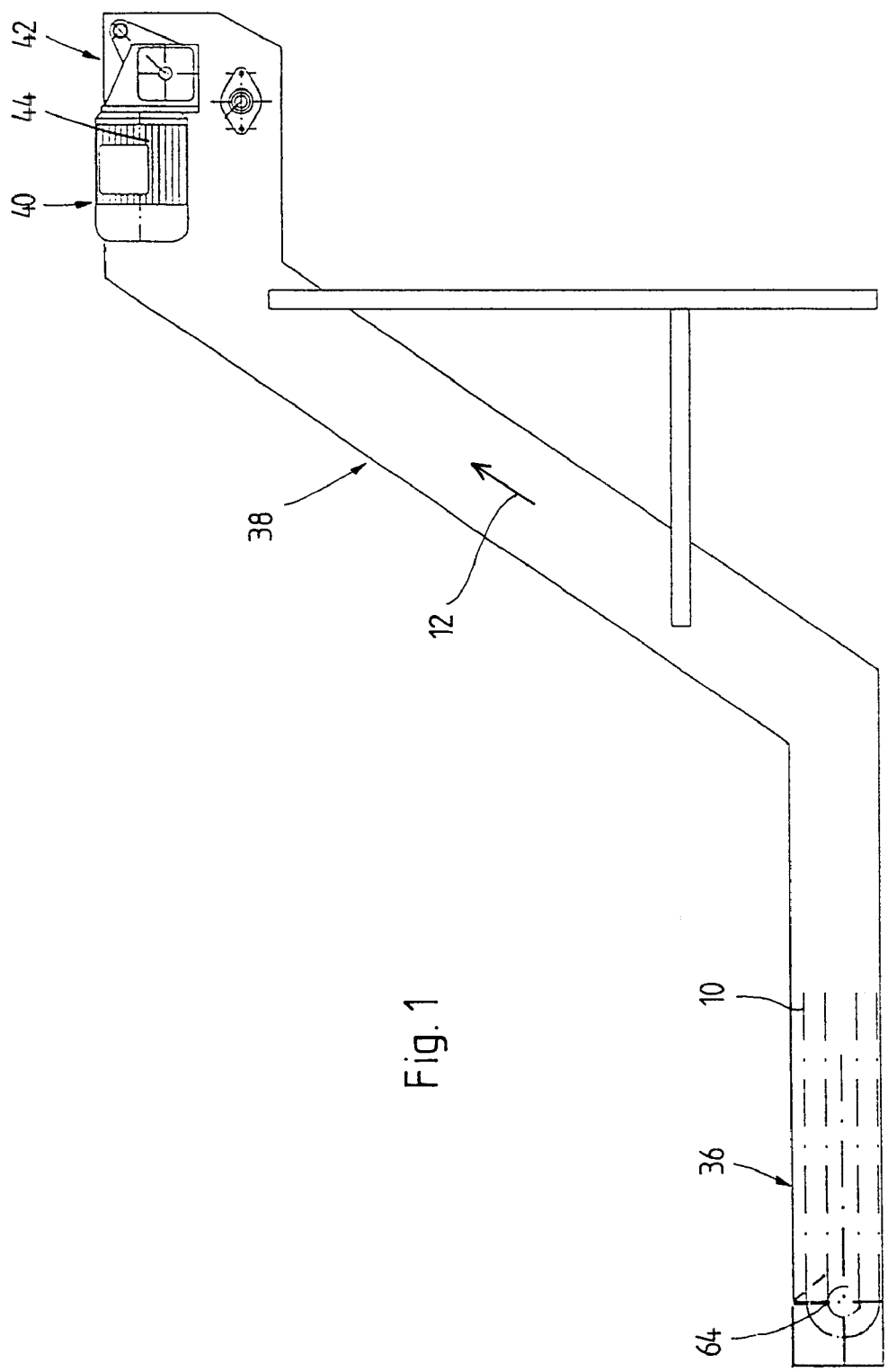
FIG. 1 shows a conveying device according to the invention in a side view.
Figure 2:
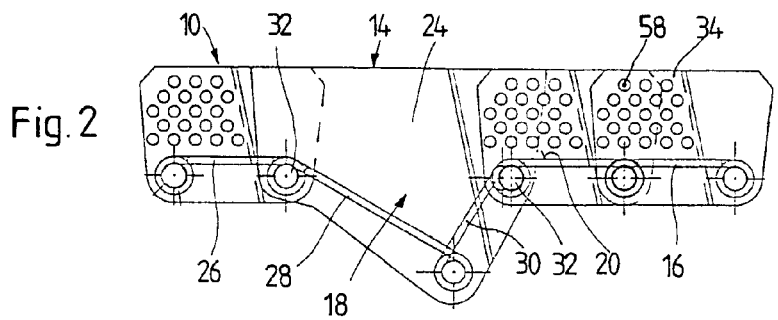
FIG. 2 shows a section of a side view of a conveyor belt according to the invention with a trough-like two-part catch.

FIG. 1 shows a side view of a conveying device according to the invention with a conveyor belt 10 and a lower horizontal area 36 with a turning point 64 for receiving the parts of conveyed material, as well as an area 38 following that with a rise, a further horizontal upper area 40 with a turning point 42, and a drive 44, which drives the conveyor belt 10 in a conveying direction 12. In the lower area 38 parts of conveyed material are fed onto the conveyor belt, transported, and discharged at the turning point 42. The conveyor belt 10 is made as a link belt, which has catches 14 (FIG. 2). The catches 14 form areas in which the parts of conveyed material collect, so that they can be transported up or down. In this case the angle of inclination of the catches 14 is designed so that no parts of conveyed material roll or slide in a rising area or a sinking area.

FIG. 2 shows a section of the link belt 10 with a catch 14 according to the invention and chain links 26. The catches 14 are designed as links of the link belt 10 and are deepened trough-like in comparison with the transportation plane 16. In a turning area 42 the link belt 10 is turned around and the parts of conveyed material are discharged. Strippers 22 are located below the turn-around point 42 and the link belt 10 is completely stripped by the stripper 22 lying elastically against its conveying surface 20 (FIG. 6, FIG. 7).

Figure 8:
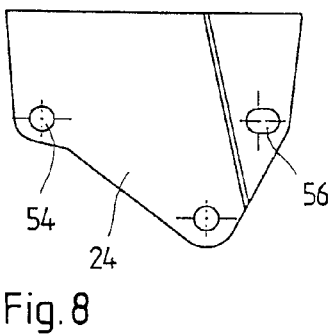
Figure 5:
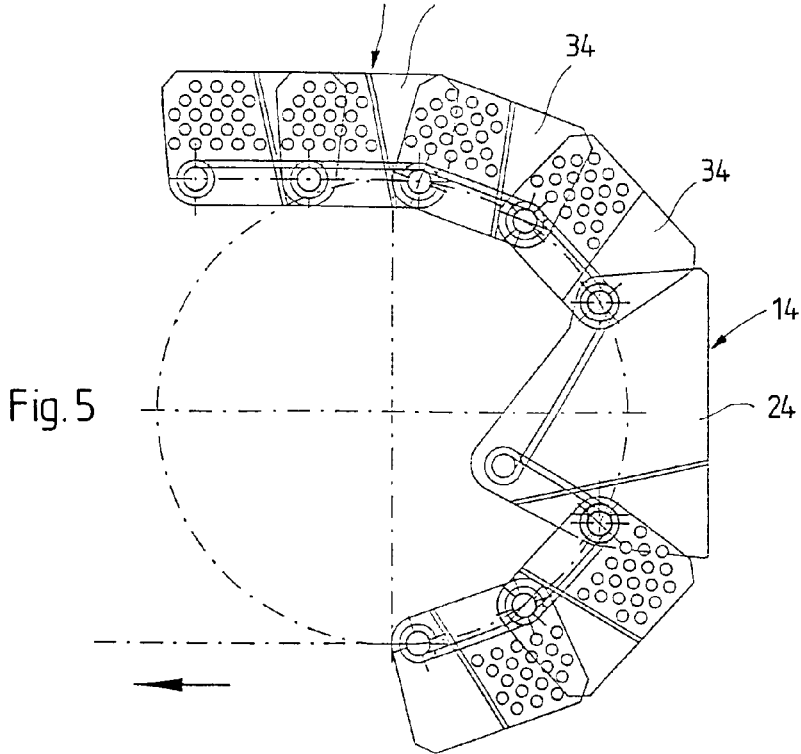
FIG. 5 shows a section of a conveyor belt according to FIG. 2 in the area of an end turn-around point.

The catch 14 has side walls 24, which are located in the holes 54 for receiving articulations 32 and in the holes 56 made as slotted holes (FIG. 8). The link belt 10 at the turn-around point 42 is shown in FIG. 5.

The stripper 22 is located over the entire width between the side walls 24, 34 of the link belt 10. The chain links 26 of the link belt 10 and the catches 14 are hinged with one another in the conveying direction 12. The catch 14 is made in two parts (FIG. 2) and the individual partial surfaces 28, 30 are articulated connecting with one another. Side walls 24 of the catches 14 are made of burled, partially overlapping individual segments 24.

Figure 3:
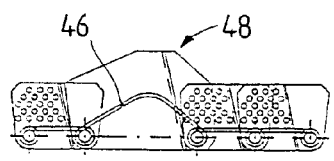
FIG. 3 shows a section of a side view of a conveyor belt according to the invention with a ridge-like two-part catch.
Figure 4:
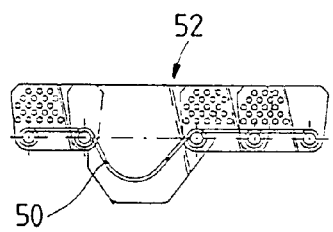
FIG. 4 shows a section of a side view of a conveyor belt according to the invention with a trough-like one-part catch.

FIG. 3 shows a further design of a ridge-like catch 46 according to the invention as a chain link of a link belt 48. The catch 46 is made in one piece out of an elastic material. FIG. 4 shows a catch 50 also made in one piece in the form of a trough of a link belt 52. The elastic material makes a length compensation possible during a turn in the area of the turning point 42.

Further, the strippers 22 are located at the turning point 42 on the underside of the conveyor belt 10 (FIG. 6, FIG. 7). The strippers 22 are loaded by the springs 60, 62 with a force in the direction of the conveyor belt 10, so that the surface thereof is completely stripped. The strippers 22 are made over the entire width of the conveyor belt 10 and thus remove parts of conveyed material adhering to the conveying surface 20 or to the side walls 24, 34. The burling 58 of the side walls 34 advantageously reduces the adhesion of the adhering parts of conveyed material. In this case the conveying direction is designed so that in the case of an angled line in the area of the material feed the conveyor belt has an arched course, so that the connecting dimensions of the catches as well as the intermediate distances from catcher to catcher extend into the adjacent steep area connected in a straight line with the tangential motion, and thus clamping resulting from a cord shortening is excluded.

What is claimed is:

1. Conveying device comprising:

an endless conveyor belt; and catches extending essentially transverse to a conveying direction;

wherein the catches are deepened trough or elevated ridge modifications of a conveying surface; and wherein the catches are completely swept by at least one stripper lying elastically against the conveying surface.

2. Conveying device according to claim 1, further comprising side walls, wherein the stripper is located over an entire width between the side walls of the conveyor belt.

3. Conveying device according to claim 1, wherein the conveyor belt is a link belt, and the catch is at least one link of the link belt.

4. Conveying device according to claim 3, wherein individual links of the link belt and the catch are connected with one another in hinged fashion in the conveying direction.

5. Conveying device according to claim 2, wherein the catch is made in several parts, and individual partial surfaces are connected articulated with one another.

6. Conveying device according to claim 2, wherein the catch is made in one piece out of a springy material.

7. Conveying device according to claim 3, wherein the catch is connected longitudinally elastically with adjacent links of the link belt.

8. Conveying device according to claim 1, wherein articulations are located in slotted hole guides of side walls of the catches.

9. Conveying device according to claim 1, wherein the conveyor belt is made in one piece out of a single, endless structural element and the structural element has areas which are made as said catches.

10. Conveying device according to claim 1, wherein the catches have side walls which are made out of burled, partially overlapping individual segments.

11. Conveying device according to one of the preceding claims, characterized in that the conveying surface (20) and/or the side walls (24) are made burled (58).

12. Conveying device according to claim 1, wherein the elastic stripper is made out of a spring steel.

13. Conveying device according to claim 1, wherein the elastic stripper is made out of a plastic.

* * * * *